3,116,320
PROCESS OF MAKING PENTAERYTHRITOL-
TETRANITRATE
Francis W. Brown, Selinsgrove, Pa., assignor to the United States of America as represented by the Secretary of the Navy
No Drawing. Filed July 17, 1961, Ser. No. 126,478
5 Claims. (Cl. 260—467)
(Granted under Title 35, U.S. Code (1952), sec. 266)

The invention described herein may be manufactured and used by or for the Government of the United States of America for governmental purposes without the payment of any royalties thereon or therefor.

This invention relates to the manufacture of esters of pentaerythritoltrinitrate.

Pentaerythritoltrinitrate (petrin) has been manufactured by the action of concentrated nitric-sulphuric acid mixtures at temperatures ranging from about 0 to 5° C., in the presence of an inert solvent which selectively extracts the pentaerythritoltrinitrate (petrin) formed from the other allied nitrated products of the reaction. This process is long and extensive however.

Petrin has also been prepared by the alkaline hydrolysis of pentaerythritol tetranitrate (PETN). In this process an equal molar concentration of PETN and sodium methylate in methyl alcohol solution are refluxed for two hours. Then the reaction mixture is cooled to below room temperature and acidified with a mineral acid. The reaction is more than 50% incomplete and the product formed is contaminated by oxidation and thermal degradation products. Thus the purification of such petrin is difficult and costly; also the sodium methylate and the number of steps required in this process increased the cost thereof to the point where it is not especially attractive.

The hydrolysis of PETN to petrin is illustrated by the following equilibrium type of reaction:

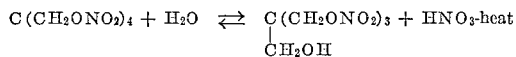

The equilibrium is primarily towards the left due to the thermodynamics of the system.

It is therefore an object of this invention to provide a cheaper and more economical route for the preparation of pentaerythritoltrinitrate.

Yet another object of this invention is to provide a new route for the manufacture of pentaerythritoltrinitrate which gives a purer product.

Other objects and many of the attendant advantages of this invention will be readily appreciated as the same becomes better understood by reference to the following detailed description:

The foregoing objects are accomplished by first hydrolyzing PETN to form petrin, and then reacting the petrin with an organic acid to form an ester of petrin, and subsequently treating the ester with alkali to form petrin.

From the foregoing equation, it is apparent that the equilibrium thereof tends to be shifted to the right by the following factors:

(1) The use of a higher operating temperature,
(2) The removal of the nitric acid formed by physical or by chemical means,
(3) The chemical conversion of a majority of the formed petrin to an ester, the ester so formed not being as susceptible to heat and to oxidation conditions as the petrin itself.

The organic acid used in the new process has two functions: (1) solvent for the PETN starting material, (2) reactant for petrin to form an ester. The acid employed as the solvent in the instant process has a higher boiling temperature than previous solvents employed in prior methods and is not subject to oxidation as is the case for the metal alcohol solvent employed in one of the prior methods enumerated previously.

The boiling point of nitric acid is 86° C.; therefore it is desirable that the solvent have a higher boiling point so that, upon being made to boil by the application of heat, nitric acid will be physically driven off. The nitric acid may also be chemically removed by the presence of inorganic salts and/or organic compounds which react with them. The removal of nitric acid favors the equilibrium shifting to the right in the aforesaid equation and moreover avoids possible oxidation side reactions by nitric acid.

When PETN is mixed with an organic aliphatic acid and heated, an amount of a petrin ester is formed. When a small amount of an acid hydrolysis catalyst is used, such as concentrated sulphuric acid, paratoluene sulphonic acid, and the like, the yield of the petrin ester is markedly increased and the reaction time is markedly shortened. The yield is further increased by the presence of compounds in the reaction mixture that react with the formed nitric acid. It is preferable to use a compound which will react with nitric acid in conjunction with an acid catalyst to get the best yields.

The reaction gives satisfactory yields, however, when only the acid hydrolysis catalyst is used. The following example of the instant process is given by way of illustration and is not intended to limit the invention in any way:

*Example*

Ten grams of PETN and 50 ml. of glacial acetic acid were mixed in a flask and three drops of concentrated sulphuric acid were added. This reaction mixture was heated, began to boil, and finally reached a temperature of 122° C. At this time, about 30 minutes had elapsed from the start of heating. The reaction mixture was cooled to room temperature quickly then poured onto about 150 grams of ice, whereupon a solid product formed which consisted of 4.3 grams of petrin acetate and 5.6 grams of unreacted PETN. This solid reaction product was placed in a beaker of dilute sodium hydroxide solution and was allowed to stand for several hours, whereupon liquid petrin was formed in the liquid phase while the solid PETN remain undissolved.

A small amount of an oil, the diacetate of PETN was formed in the example above. Longer operating times and/or higher temperatures and/or more concentrated acid catalysts will increase the amount of this oil formed and decrease the amount of the desired product. To insure complete reaction, the initial mixture of PETN and acid may be refluxed.

Compounds which are particularly suited for the removal of nitric acid from the system are benzene, toluene, phenol and salicylic acid, and the like. The first two mentioned compounds formed mononitro compounds respectively. Hence this reaction system can be used in nitration reactions.

Petrin has long been used in the propellant art as a plasticizer for nitrocellulose.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The process of making pentaerythritoltrinitrate which comprises forming a reaction mixture of pentaerythritol tetranitrate and nonsubstituted, lower, saturated aliphatic carboxylic acid; heating the reaction mixture whereby an ester of pentaerythritoltrinitrate is formed; cooling the mixture sufficiently to cause the ester to precipitate out; and extracting the precipitate thus formed with dilute alkali, whereby pentaerythritoltrinitrate is formed.

2. The process of claim 1 in which the reaction mixture is heated to boiling and held at boiling temperature for a predetermined period of time.

3. The process of claim 2 which includes the additional step of adding up to about 1% of the weight of the reaction mixture of a strong acid hydrolysis catalyst to the mixture prior to the heating step.

4. The process of claim 3 which includes the additional step of adding sufficient material capable of being nitrated to the reaction mixture prior to the heating step, to react with nitric acid formed, said material being selected from the group consisting of benzene, toluene, phenol and salicylic acid.

5. The process of claim 3 in which the catalyst added is concentrated sulfuric acid.

References Cited in the file of this patent

Morans et al.: JACS, 76, pp. 1304–1306 (1954).